(12) United States Patent
Ding et al.

(10) Patent No.: US 12,437,566 B2
(45) Date of Patent: Oct. 7, 2025

(54) PICTURE ANNOTATION METHOD, APPARATUS, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Yang Ding, Beijing (CN); Ya Gao, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 472 days.

(21) Appl. No.: 18/084,882

(22) Filed: Dec. 20, 2022

(65) Prior Publication Data
US 2023/0119741 A1 Apr. 20, 2023

(30) Foreign Application Priority Data
Dec. 20, 2021 (CN) .......................... 202111575386.5

(51) Int. Cl.
G06V 20/70 (2022.01)
G06F 40/169 (2020.01)
G06T 7/70 (2017.01)

(52) U.S. Cl.
CPC ............ *G06V 20/70* (2022.01); *G06F 40/169* (2020.01); *G06T 7/70* (2017.01); *G06T 2207/30241* (2013.01)

(58) Field of Classification Search
CPC ... G06V 20/70; G06F 40/169; G06F 3/04845; G06F 16/5866; G06F 3/0486; G06T 7/70; G06T 2207/30241; G06T 11/60
See application file for complete search history.

(56) References Cited

U.S. PATENT DOCUMENTS

2005/0289452 A1 12/2005 Kashi et al.
2006/0041564 A1* 2/2006 Jain .......................... G06F 16/50
(Continued)

FOREIGN PATENT DOCUMENTS

CN 111367445 A 7/2020
JP 2009129401 A 6/2009
(Continued)

OTHER PUBLICATIONS

Search Report for EP Application 22115046.8 dated Mar. 15, 2023.
Office Action for Chinese Application No. 202111575386.5, dated Jun. 29, 2023, 26 pages.

*Primary Examiner* — Asher D Kells
(74) *Attorney, Agent, or Firm* — Lippes Mathias LLP

(57) ABSTRACT

A picture annotation method includes starting an annotation tool to recognize a hierarchical relationship between candidate layers in the annotation tool; acquiring an annotation event of a picture to be annotated; distributing the annotation event to at least one target master candidate layer based on the hierarchical relationship; distributing, for an arbitrary target master candidate layer, in the case where the arbitrary target master candidate layer is configured with a slave candidate layer, starting from the arbitrary target master candidate layer, the annotation event down level by level to target slave candidate layers of at least one level of the arbitrary target master candidate layer; processing the annotation event through a first target candidate layer, to which it is distributed.

15 Claims, 8 Drawing Sheets

(56) References Cited

U.S. PATENT DOCUMENTS

| | | |
|---|---|---|
| 2009/0132907 A1 | 5/2009 | Shao et al. |
| 2011/0148918 A1 | 6/2011 | Ishizawa et al. |
| 2021/0312121 A1 | 10/2021 | Wei et al. |

FOREIGN PATENT DOCUMENTS

| | | |
|---|---|---|
| WO | 2020221298 A1 | 11/2020 |
| WO | 2021068349 A1 | 4/2021 |

* cited by examiner

PICTURE ANNOTATION METHOD, APPARATUS, ELECTRONIC DEVICE, AND STORAGE MEDIUM

CROSS-REFERENCE TO RELATED APPLICATION

This application claims priority and benefits to Chinese Application No. 202111575386.5, filed on Dec. 20, 2021, the entire content of which is incorporated herein by reference.

TECHNICAL FIELD

The present disclosure relates to the technical field of computer, in particular to a picture annotation method, apparatus, an electronic device, a storage medium and a computer program product.

BACKGROUND

At present, with the development of artificial intelligence technology, image annotation has been widely used in the fields of obstacle annotation in unmanned vehicle scenario, skeleton key point annotation, and the like. For example, in the obstacle annotation of the unmanned vehicle scenario, attributes such as types, positions, occlusions, truncations, and the like of annotation boxes of pictures collected by an unmanned vehicle can be annotated.

SUMMARY

According to one aspect of the present disclosure, a picture annotation method is provided, which includes: starting an annotation tool to recognize a hierarchical relationship between candidate layers in the annotation tool; acquiring an annotation event of a picture to be annotated; distributing the annotation event to at least one target master candidate layer based on the hierarchical relationship; distributing, for an arbitrary target master candidate layer, in the case where the arbitrary target master candidate layer is configured with a slave candidate layer, starting from the arbitrary target master candidate layer, the annotation event down level by level to target slave candidate layers of at least one level of the arbitrary target master candidate layer; processing the annotation event through a first target candidate layer, to which it is distributed, wherein the first target candidate layer includes the target master candidate layer and/or the target slave candidate layer; or processing, for an arbitrary target master candidate layer, in the case where the arbitrary target master candidate layer is configured with no slave candidate layer, the annotation event through a second target candidate layer, to which it is distributed, wherein the second target candidate layer includes the target master candidate layer.

According to another aspect of the present disclosure, another picture annotation method is provided, which includes: receiving an annotation event of a picture to be annotated sent by a browser, wherein the annotation event carries an annotation intention and a set of position information corresponding to the annotation intention, the set of position information being generated based on position information of each pixel point covered by a movement trajectory of the mouse; generating a bitmap according to the annotation intention and the set of position information; sending the bitmap to the browser, wherein the bitmap is configured to process the annotation event.

According to another aspect of the present disclosure, an electronic device is provided, which includes: at least one processor; and a memory communicatively connected to the at least one processor; wherein instructions executable by the at least one processor are stored in the memory, and the instructions are executed by the at least one processor, so that the at least one processor can execute the picture annotation method.

According to another aspect of the present disclosure, a non-transitory computer-readable storage medium storing computer instructions is provided, the computer instructions are configured to cause the computer to execute the picture annotation method.

It should be understood that what is described in the present section is not intended to recognize key or important features of embodiments of the present disclosure, nor is it intended to limit the scope of the present disclosure. Other features of the present disclosure will be readily understood through the following description.

BRIEF DESCRIPTION OF THE DRAWINGS

The accompanying drawings are used to better understand the present solution, and do not constitute a limitation to the present disclosure, in which.

DETAILED DESCRIPTION

Figure 1:
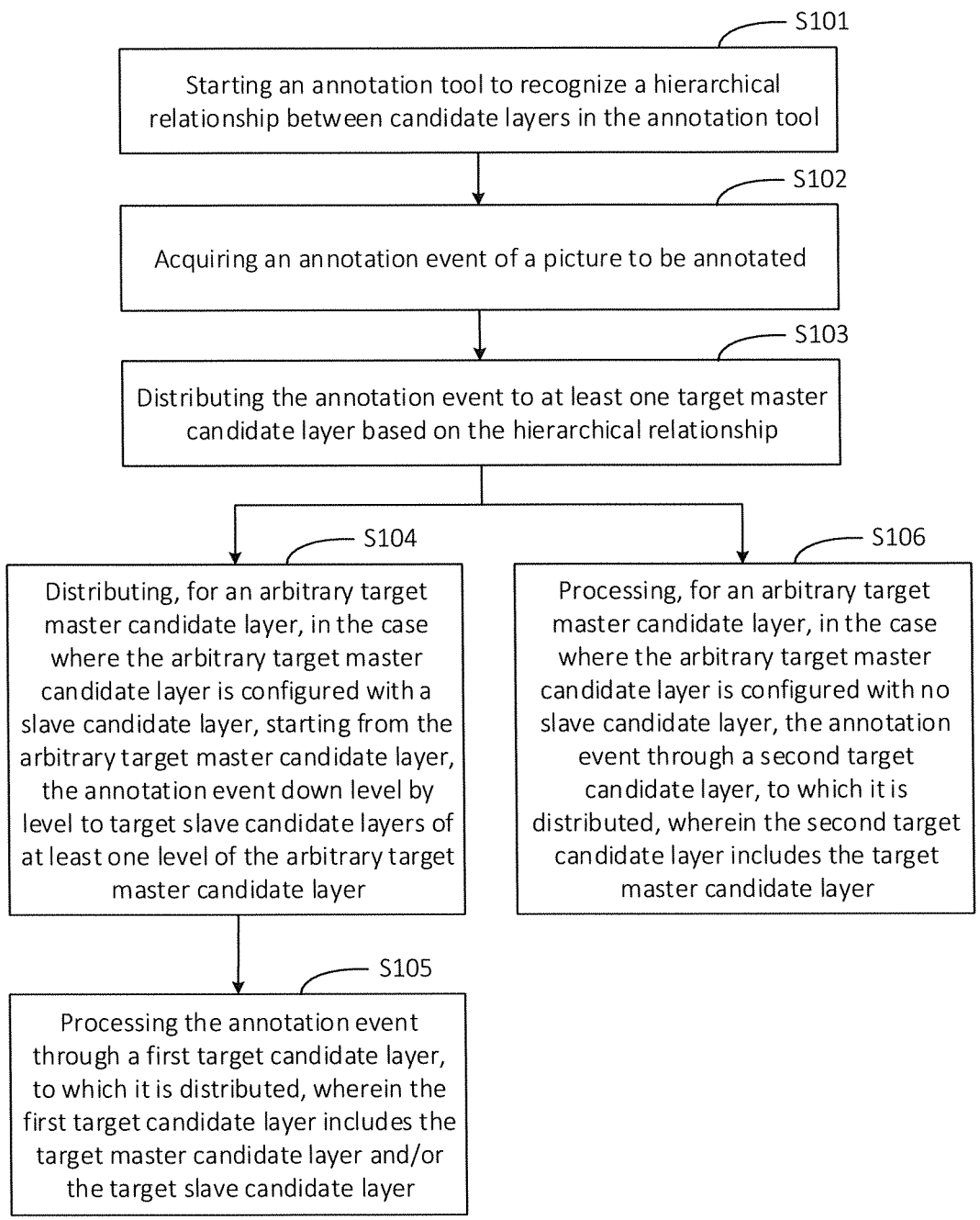
FIG. 1 is a schematic flowchart of a picture annotation method according to a first embodiment of the present disclosure.

Exemplary embodiments of the present disclosure will be described below in conjunction with the accompanying drawings, which include various details of the embodiments of the present disclosure to facilitate understanding, and they should be regarded as exemplary only. Accordingly, those of ordinary skill in the art will recognize that various changes and modifications of the embodiments described herein can be made without departing from the scope and spirit of the present disclosure. Also, descriptions of well-known functions and constructions are omitted in the following description for clarity and conciseness.

AI (Artificial Intelligence) is a technical science that studies and develops theories, methods, technologies and application systems for simulating, extending and expanding human intelligence. At present, AI technology has the advantages of high degree of automation, high precision, and low cost, and has been widely used.

Computer Vision refers to machine vision that uses cameras and computers instead of human eyes to recognize, track and measure targets, and further performs graphics processing, so as to be processed by computers as images that are more suitable for human eyes to observe or being sent to instruments for detection. Computer Vision is a comprehensive discipline, including computer science and engineering, signal processing, physics, applied mathematics and statistics, neurophysiology and cognitive science, etc.

Image Processing refers to the technology of analyzing images with computers to achieve the desired results. Image Processing generally refers to digital image processing. Digital image refers to a large two-dimensional array obtained by shooting with devices such as industrial cameras, video cameras, scanners, and the like, and the elements of the array are referred to as pixels, and their values are referred to as gray values. Image processing technology generally includes three parts of image compression, enhancement and restoration, matching, description and recognition.

Data Annotation is a behavior of processing artificial intelligence learning data through data processing personnel with the help of an annotation tool, includes operations such as categorizing, sorting, editing, error-correcting, marking and commenting on data to be annotated, such as text, image, voice, video, and the like, adds labels to the data to be annotated, and produces machine-readable data codes that meet the training requirements of machine learning. Usually, the types of data annotation include: types such as image annotation, voice annotation, text annotation, video annotation, and the like. The basic forms of marking include annotating picture boxes, 3D picture boxes, text transcription, image dotting, target object outlines, and the like.

At present, with the development of artificial intelligence technology, image annotation has been widely used in the fields of obstacle annotation in unmanned vehicle scenario, skeleton key point annotation, and the like. For example, in the obstacle annotation of the unmanned vehicle scenario, attributes such as types, positions, occlusions, truncations, and the like of annotation boxes of pictures collected by an unmanned vehicle can be annotated. However, the picture annotation tool in the related art has problems such as poor scalability and high development difficulty.

Therefore, embodiments of the disclosure provide picture annotation methods, picture annotation apparatus, electronic devices, and storage media.

FIG. 1 is a schematic flowchart of a picture annotation method according to a first embodiment of the present disclosure.

As shown in FIG. 1, the picture annotation method of the first embodiment of the present disclosure includes:

S101 of starting an annotation tool to recognize a hierarchical relationship between candidate layers in the annotation tool.

It should be noted that the execution subject of the picture annotation method of the embodiment of the present disclosure may be a hardware device having data information processing capability and/or necessary software required to drive the hardware device to operate. Optionally, the execution subject may include workstations, servers, computers, user terminals and other intelligent devices. Wherein the user terminal includes, but is not limited to, a mobile phone, a computer, an intelligent voice interaction device, a smart home appliance, a vehicle terminal, and the like. In one embodiment, the execution subject may be a browser, and the picture annotation method of the embodiment of the present disclosure will be described below by taking the execution subject as a browser as an example.

In an embodiment of the present disclosure, the browser can start the annotation tool.

In one embodiment, the browser may receive an operation instruction from the user for starting the annotation tool, and start the annotation tool based on the above operation instruction. For example, the user may input the URL (Uniform Resource Locator) of the annotation tool in the address input field of the browser, and correspondingly, the browser may receive an operation instruction from the user for inputting address, and start the annotation tool. For example, the annotation tool may be preloaded in the browser, and the user may click the icon of the annotation tool on the interactive interface of the browser. Correspondingly, the browser may receive an operation instruction from the user for clicking the icon, and start the annotation tool.

In one embodiment, the browser may start the annotation tool in response to satisfying a condition for starting the annotation tool. It should be noted that the conditions for starting the annotation tool will not be excessively limited. For example, the conditions for starting the annotation tool include, but are not limited to, the fact that the current time reaches s preset time and so on.

It should be noted that the categories of the annotation tool will not be excessively limited. For example, annotation tools include, but are not limited to, B/S (Browser/Server) architecture, and the like.

In an embodiment of the present disclosure, the browser can recognize the hierarchical relationship between the candidate layers in the annotation tool. It should be noted that the annotation tool has a plurality of candidate layers, and the number of the candidate layers and the hierarchical relationship between the candidate layers will not be excessively limited.

In an embodiment of the present disclosure, the candidate layers include at least one master candidate layer, and slave candidate layers of at least one level corresponding to each master candidate layer. Wherein the slave candidate layers of the first level are used for aggregation into the master candidate layer, and the slave candidate layers of the current level are used for aggregation into the slave candidate layers of the previous level. It can be understood that the master candidate layers have a corresponding relationship with the slave candidate layers, and different master candidate layers may correspond to different slave candidate layers.

Figure 2:
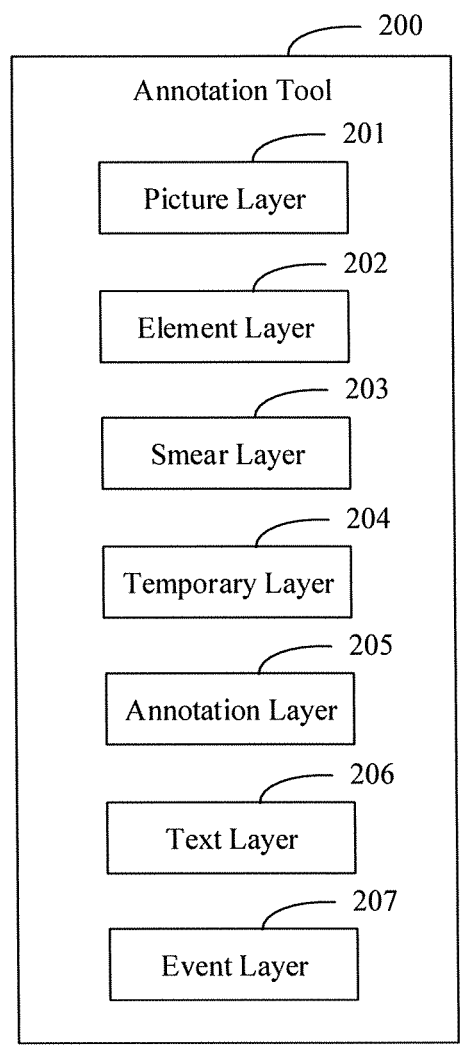
FIG. 2 is a schematic diagram of an annotation tool of a picture annotation method according to a second embodiment of the present disclosure.

For example, as shown in FIG. 2, the annotation tool 200 has seven master candidate layers, which respectively are picture layer 201, element layer 202, smear layer 203, temporary layer 204, annotation layer 205, text layer 206 and event layer 207.

Wherein the picture layer 201 includes a number 3 of slave candidate layers of the first level (not shown in the figure), which respectively are a slave candidate layer of the first format picture, a slave candidate layer of the second format picture, and a slave candidate layer of the third format picture;

Wherein the element layer 202 includes a number 2 of slave candidate layers of the first level (not shown in the figure), which respectively are a slave candidate layer of elements and a slave candidate layer of addition and deletion elements. Wherein the slave candidate layer of elements includes a number 6 of slave candidate layers of the second level, which respectively are a slave candidate layer of dot element, a slave candidate layer of line element, a slave candidate layer of rectangle element, a slave candidate layer of polygon element, a slave candidate layer of polyline element, a slave candidate layer of circle element. Wherein each slave candidate layer of the second level includes a number 2 of slave candidate layers of the third level, which respectively are a slave candidate layer of shape and a slave candidate layer of prop and style.

Wherein the smear layer 203 includes a number 3 of slave candidate layers of the first level (not shown in the figure), which respectively are a slave candidate layer of smearing, a slave candidate layer of addition of smearing, and a slave candidate layer of deletion of smearing. Wherein the slave candidate layer of smearing includes a number 3 of slave candidate layers of the second level, which respectively are a slave candidate layer of drawing, a slave candidate layer of erasing, and a slave candidate layer of echoing.

Wherein the temporary layer 204 includes a number 1 of slave candidate layer of the first level (not shown in the figure), which is a temporary slave candidate layer.

Wherein the annotation layer 205 includes a number 2 of slave candidate layers of the first level (not shown in the figure), which respectively are a slave candidate layer of annotation and a slave candidate layer of addition and deletion of annotation. Wherein the slave candidate layer of annotation includes a number 3 of slave candidate layers of the second level, which respectively are a slave candidate layer of annotation shape, a slave candidate layer of event observation, and a slave candidate layer of prop and icon.

Wherein the text layer 206 includes a number 2 of slave candidate layers of the first level (not shown in the figure), which respectively are a slave candidate layer of text and a slave candidate layer of addition and deletion of text. Wherein the slave candidate layer of text includes a number 2 of slave candidate layers of the second level, which respectively are a slave candidate layer of text shape, and a slave candidate layer of text content and style.

Wherein the event layer 207 includes a number 1 of slave candidate layer of the first level (not shown in the figure), which is a slave candidate layer of event.

S102 of acquiring an annotation event of a picture to be annotated.

In one embodiment, the browser may acquire the annotation event generated by the user through the annotation tool. It can be understood that the user can use the annotation tool to annotate the picture to be annotated to generate an annotation event.

For example, the user may click icons such as dots, lines, boxes and the like on the interactive interface of the annotation tool, and drag the mouse on the picture to be annotated to perform, on the picture to be annotated, annotation such as dots, lines, boxes, and the like, and correspondingly the browser can acquire the above-mentioned annotation events generated by the user through the annotation tool.

For example, the user may click icon of smearing on the interactive interface of the annotation tool, and drag the mouse on the picture to be annotated to perform, on the picture to be annotated, smearing annotation, and correspondingly the browser can acquire the above-mentioned annotation event generated by the user through the annotation tool.

For example, the user may click icon of inputting text on the interactive interface of the annotation tool, and add text on the picture to be annotated to perform, on the picture to be annotated, text annotation, and correspondingly the browser can acquire the above-mentioned annotation event generated by the user through the annotation tool.

In one embodiment, the browser can input the picture to be annotated into the annotation model in the annotation tool, and the annotation model can output the annotation events of the picture to be annotated. It should be noted that the annotation model is preset in the annotation tool, and the categories of the annotation models will not be excessively limited.

It should be noted that the categories of the picture to be annotated and the categories of the annotation events will not be excessively limited.

For example, the annotation events may include annotation events for elements in a picture. Wherein the elements include, but are not limited to, dot elements, line elements, box elements and so on. The annotation events for elements in a picture may include annotation events for attributes of elements such as position, type and like. For example, annotation events for elements in a picture include, but are not limited to, annotation events such as whether the position of the element is accurate, whether the object to be marked corresponding to the element is a front wheel or a rear wheel, and so on.

For example, annotation events may include drawing annotation events, erasing annotation events, echoing annotation events, and so on.

S103 of distributing the annotation event to at least one target master candidate layer based on the hierarchical relationship.

In an embodiment of the present disclosure, the browser can recognize the master candidate layers from the candidate layers of the annotation tool based on the hierarchical relationship, and distribute the annotation event to at least one target master candidate layer. It should be noted that the target master candidate layer is one of the master candidate layers, and the number of the target master candidate layers will not be excessively limited, for example, there may be one or more target master candidate layers.

Continuing to take FIG. 2 as an example, when the annotation event is addition or deletion of a picture, the browser can distribute the annotation event to the picture layer; when the annotation event is addition or deletion of an element, the browser can distribute the annotation event to the element layer; when the annotation event is addition or deletion of smearing, the browser can distribute the annotation event to the smear layer; when the annotation event is addition or deletion of annotation, the browser can distribute the annotation event to the annotation layer; when the annotation event is addition or deletion of text, the browser can distribute the annotation event to the text layer.

Continuing to take FIG. 2 as an example, the browser can distribute the annotation event to the event layer, and distribute the annotation event to other target master candidate layers based on the event layer. For example, when the annotation event is addition or deletion of an element, the browser can distribute the annotation event to the event layer, and distribute the annotation event to the element layer based on the event layer.

Continuing to take FIG. 2 as an example, when the annotation event is a temporary annotation event, the browser can distribute the annotation event to the temporary layer. It should be noted that the temporary annotation event refers to a annotation event that is not a final annotation event.

S104 of distributing, for an arbitrary target master candidate layer, in the case where the arbitrary target master candidate layer is configured with a slave candidate layer, starting from the arbitrary target master candidate layer, the annotation event down level by level to target slave candidate layers of at least one level of the arbitrary target master candidate layer.

In an embodiment of the present disclosure, the browser can distribute, for an arbitrary target master candidate layer, in the case where the arbitrary target master candidate layer is configured with a slave candidate layer, starting from the arbitrary target master candidate layer, the annotation event down level by level to target slave candidate layers of at least one level of the arbitrary target master candidate layer. It should be noted that the number of target slave candidate layers, to which it is distributed, will not be excessively limited. For example, the annotation event may be distributed to a plurality of target slave candidate layers of an arbitrary level, or the annotation event may be distributed to one target slave candidate layer of an arbitrary level.

Continuing to take FIG. 2 as an example, when the annotation event is addition of a dot element, the browser can distribute the annotation event to the element layer, and distribute the annotation event down level by level to the slave candidate layer of elements, the slave candidate layer of dot element, and the slave candidate layer of shape and the slave candidate layer of prop and style corresponding to the slave candidate layer of dot element; and the annotation event may also be distributed to the slave candidate layer of addition and deletion.

Continuing to take FIG. 2 as an example, when the annotation event is an annotation event of addition of drawing, the browser can distribute the annotation event to the smear layer, and distribute the annotation event down level by level to the slave candidate layer of smearing and the slave candidate layer of drawing; and the annotation event may also be distributed to the slave candidate layer of addition of smearing.

S105 of processing the annotation event through a first target candidate layer, to which it is distributed, wherein the first target candidate layer includes the target master candidate layer and/or the target slave candidate layer.

In an embodiment of the present disclosure, the processing the annotation event through the first target candidate layer, to which it is distributed, may include the following three possible implementation modes:

Mode 1: processing the annotation event through a target master candidate layer, to which it is distributed.

In one embodiment, the annotation event may only be processed through the target master candidate layer, to which it is distributed. Continuing to take FIG. 2 as an example, when the annotation event is addition of dot element, the target master candidate layer, to which it is distributed, is the element layer, and the annotation event may be processed through the element layer.

Mode 2: processing the annotation event through a target slave candidate layer, to which it is distributed.

In one embodiment, the annotation event may be processed through the target slave candidate layer, to which it is distributed.

For example, the annotation event may be processed through the target slave candidate layers of the last level, to which it is distributed. Continue to take FIG. 2 as an example, when the annotation event is addition of dot element, the target slave candidate layers, to which it is distributed, include the slave candidate layer of elements, the slave candidate layer of dot element, and the slave candidate layer of shape and the slave candidate layer of prop and style corresponding to the slave candidate layer of dot element, and the annotation event may be processed respectively through the slave candidate layer of shape and the slave candidate layer of prop and style corresponding to the slave candidate layer of dot element. The target slave candidate layers, to which it is distributed, further include the slave candidate layer of addition and deletion, and the annotation event may be processed through the slave candidate layer of addition and deletion.

For example, the annotation event may be processed through each target slave candidate layer, to which it is distributed. Continue to take FIG. 2 as an example, when the annotation event is addition of drawing, the target slave candidate layers, to which it is distributed, include the slave candidate layer of smearing, the slave candidate layer of drawing and the slave candidate layer of addition of smearing, and the annotation event may be respectively processed through the slave candidate layer of smearing, the slave candidate layer of drawing and the slave candidate layer of addition of smearing.

Mode 3: processing the annotation event through a target master candidate layer and a target slave candidate layer, to which it is distributed.

In one embodiment, the annotation event may be processed through a target master candidate layer and a target slave candidate layer, to which it is distributed. For example, the annotation event may be processed through the target master candidate layer, to which it is distributed, and the target slave candidate layers of the last level corresponding to the target master candidate layer; or the annotation event may be processed through the target master candidate layer, to which it is distributed, and each target slave candidate layer corresponding to the target master candidate layer.

In an embodiment of the present disclosure, the processing the annotation event through the target candidate layers, to which it is distributed, may include distribution of the annotation event down level by level through the target candidate layers, to which it is distributed, or presentation of the annotation event through the target candidate layers, to which it is distributed. Continue to take FIG. 2 as an example, when the annotation event is addition of dot element, the added dot element may be presented through the smear layer, to which it is distributed; and when the annotation event is addition of drawing, the added drawing may be presented through the smear layer, to which it is distributed.

S106 of processing, for an arbitrary target master candidate layer, in the case where the arbitrary target master candidate layer is configured with no slave candidate layer, the annotation event through a second target candidate layer, to which it is distributed, wherein the second target candidate layer includes the target master candidate layer.

In an embodiment of the present disclosure, for an arbitrary target master candidate layer, in the case where the arbitrary target master candidate layer is configured with a slave candidate layer, at this time only the annotation event may be distributed to the arbitrary target master candidate layer, and the annotation event may be processed through a second target candidate layer, to which it is distributed, wherein the second target candidate layer includes the target master candidate layer.

For example, when the annotation event is addition of dot element, the browser can distribute the annotation event to the element layer, and in the case where the element layer is configured with no slave candidate layer, the annotation event can be processed through the element layer.

For example, when the annotation event is an annotation event of addition of drawing, the browser can distribute the annotation event to the smear layer, and in the case where the smear layer is configured with no slave candidate layer, the annotation event can be processed through the smear layer.

To sum up, according to the picture annotation method of the embodiment of the present disclosure, the hierarchical relationship between the candidate layers in the annotation tool may be recognized, and the annotation event may be distributed to the target master candidate layer based on the hierarchical relationship, and in the case where the target master candidate layer is configured with a slave candidate layer, continue to be distributed down level by level to the target slave candidate layers of at least one level of the target master candidate layer, and the annotation event may be processed through the target candidate layers, to which it is distributed. Thus the distribution of the annotation event can be realized based on the hierarchical relationship of the annotation tool, so that the coupling degree of the annotation event between the candidate layers is small, especially for online annotation scenarios on the browser side, the scalability is better, and development difficulty and cost of image annotation is greatly reduced.

Figure 3:
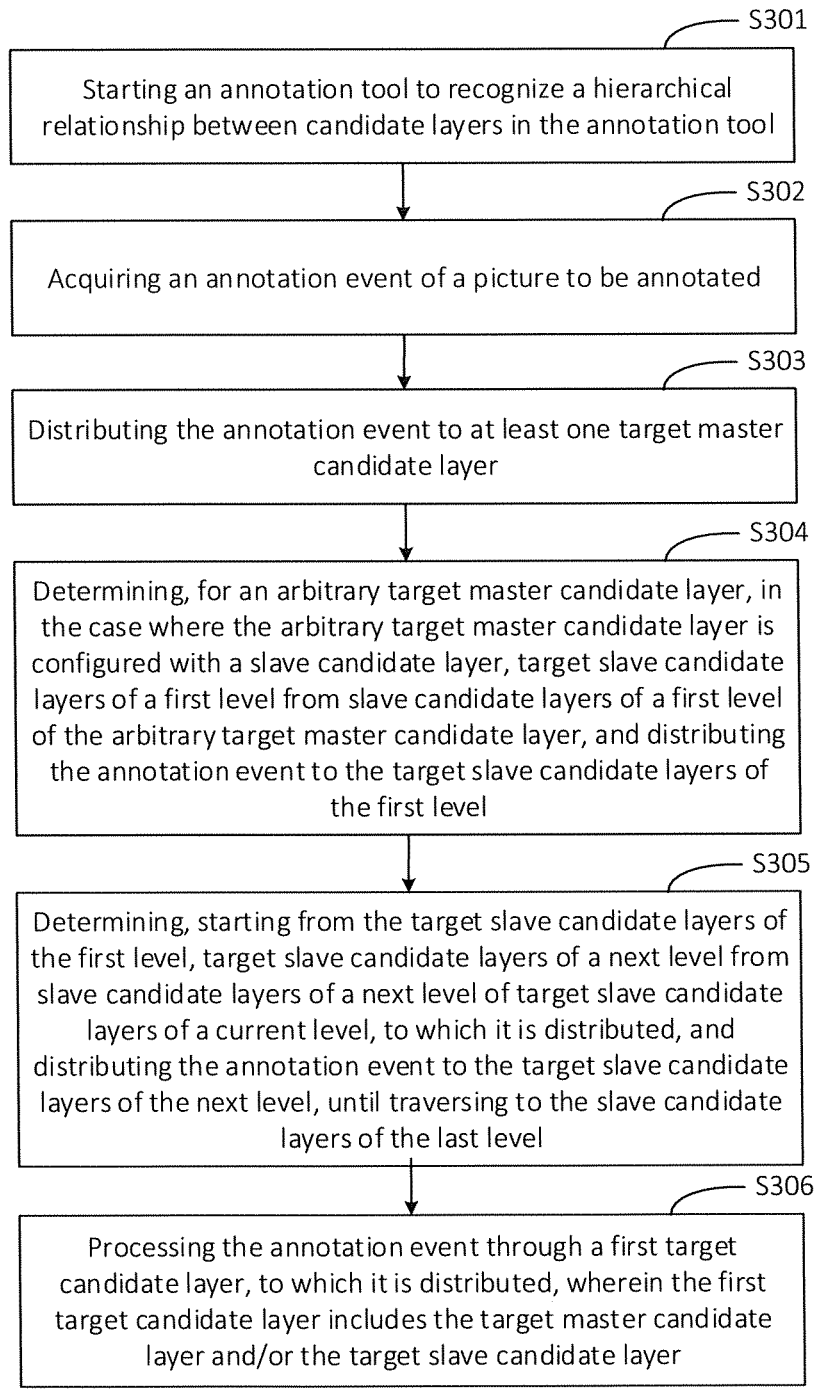
FIG. 3 is a schematic flowchart of a picture annotation method according to a third embodiment of the present disclosure.

FIG. 3 is a schematic flowchart of a picture annotation method according to a third embodiment of the present disclosure.

As shown in FIG. 3, the picture annotation method of the third embodiment of the present disclosure includes:

S301 of starting an annotation tool to recognize a hierarchical relationship between candidate layers in the annotation tool.

S302 of acquiring an annotation event of a picture to be annotated.

S303 of distributing the annotation event to at least one target master candidate layer.

Relevant contents of the steps S301-S303 can be referred to the above described embodiment, and will not be repeated here.

S304 of determining, for an arbitrary target master candidate layer, in the case where the arbitrary target master candidate layer is configured with a slave candidate layer, target slave candidate layers of a first level from slave candidate layers of a first level of the arbitrary target master candidate layer, and distributing the annotation event to the target slave candidate layers of the first level.

S305 of determining, starting from the target slave candidate layers of the first level, target slave candidate layers of a next level from slave candidate layers of a next level of target slave candidate layers of a current level, to which it is distributed, and distributing the annotation event to the target slave candidate layers of the next level, until traversing to the slave candidate layers of the last level.

In one embodiment, for an arbitrary target master candidate layer, in the case where the arbitrary target master candidate layer is configured with a slave candidate layer, target slave candidate layers of a first level may be determined from slave candidate layers of a first level of the arbitrary target master candidate layer, and the annotation event may be distributed to the target slave candidate layers of the first level, and the target slave candidate layers of the second level may be determined from the slave candidate layers of the second level of the target slave candidate layers of the first level, to which it is distributed, and the annotation event may be distributed to the target slave candidate layers of the second level, and the target slave candidate layers of the third level may be determined from the slave candidate layers of the third level of the target slave candidate layers of the second level, to which it is distributed, and in response to the fact that the target slave candidate layers of the third level are configured with no slave candidate layers of the fourth level, the traversing ends.

Continuing to take FIG. 2 as an example, when the annotation event is addition of dot element, the browser can distribute the annotation event to the element layer, that is, the element layer is the target master candidate layer at this time, and the target slave candidate layers of the first level may be determined from the slave candidate layers of the first level of the element layer. For example, the slave candidate layers of elements, and the slave candidate layers of addition and deletion of elements both may be determined as the target slave candidate layers of the first level.

Further, the target slave candidate layers of the second level may be determined from the slave candidate layers of the second level of the slave candidate layers of elements, and for example, the slave candidate layers of dot element may be determined as the target slave candidate layers of the second level, and the target slave candidate layers of the third level may be determined from the slave candidate layers of the third level of the slave candidate layers of dot element, for example, the slave candidate layers of shape and the slave candidate layers of prop and style both may be determined as the target slave candidate layers of the third level.

S306 of processing the annotation event through a first target candidate layer, to which it is distributed, wherein the first target candidate layer includes the target master candidate layer and/or the target slave candidate layer.

Relevant contents of the step S306 can be referred to the above described embodiment, and will not be repeated here.

In one embodiment, for an arbitrary master candidate layer, in the case where the arbitrary master candidate layer is configured with a slave candidate layer, attribute configuration information of the arbitrary master candidate layer may be acquired, and starting from the arbitrary master candidate layer, the attribute configuration information may be distributed down level by level to each slave candidate layer of each level of the arbitrary master candidate layer, wherein the attribute configuration information is configured to configure attributes of the candidate layers, the candidate layers including the master candidate layer and the slave candidate layer. It should be noted that the categories of attributes and attribute configuration information will not be excessively limited, for example, attributes may include an attribute whether it can be edited. Thus in this method, based on the attribute configuration information of the master candidate layer, the attributes of each slave candidate layer of each level of the master candidate layer may be automatically configured, which can improve attribute configuration efficiency of the slave candidate layers, and ensure that the attributes of the slave candidate layers are consistent with those of the master candidate layer.

Continuing to take FIG. 2 as an example, the attribute configuration information of the element layer may be acquired, and the attribute configuration information of the element layer may be distributed down level by level to the slave candidate layer of elements, the slave candidate layer of dot element, and the slave candidate layer of shape and the slave candidate layer of prop and style corresponding to the slave candidate layer of dot element.

To sum up, according to the picture annotation method of the embodiment of the present disclosure, for an arbitrary target master candidate layer, in the case where the arbitrary target master candidate layer is configured with a slave candidate layer, the target slave candidate layers of the first level may be determined from the slave candidate layers of the first level of the arbitrary target master candidate layer, and the annotation event may be distributed to the target slave candidate layers of the first level, and starting from the target slave candidate layers of the first level, the target slave candidate layers of the next level may be determined from the slave candidate layers of the next level of the target slave candidate layers of the current level, to which it is distributed, and the annotation event may be distributed to the target slave candidate layers of the next level, until traversing to the slave candidate layers of the last level, so as to realize level by level distribution of the annotation event.

Figure 4:
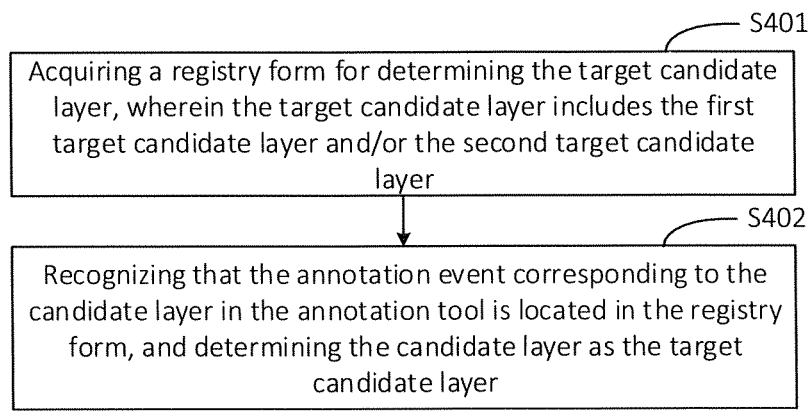
FIG. 4 is a schematic flowchart of a picture annotation method according to a fourth embodiment of the present disclosure.

FIG. 4 is a schematic flowchart of a picture annotation method according to a fourth embodiment of the present disclosure.

As shown in FIG. 4, the picture annotation method of the fourth embodiment of the present disclosure includes:

S401 of acquiring a registry form for determining the target candidate layer, wherein the target candidate layer includes the first target candidate layer and/or the second target candidate layer.

In an embodiment of the present disclosure, the browser may acquire a registry form for determining the target candidate layers, wherein the target candidate layers include the first target candidate layers and/or the second target candidate layers, wherein the first target candidate layers include the target master candidate layers and/or the target slave candidate layers, and the second target candidate layers include the target master candidate layers.

In one embodiment, the registry form may be preset in the storage space of the browser and/or the annotation tool, so as to acquire the registry form from the storage space.

In one embodiment, the acquiring a registry form for determining the target candidate layer may include the following three possible implementation modes:

Mode 1: acquiring, in the case where the target candidate layer is the target master candidate layer, a first registry form for determining the target master candidate layer from a local storage of the annotation tool.

In one embodiment, the first registry form for determining the target master candidate layer may be preset in the storage space of the annotation tool, and in the case where the target candidate layer is the target master candidate layer, the above described first registry form may be acquired from the local storage of the annotation tool.

Mode 2: acquiring, in the case where the target candidate layer is a target slave candidate layer of a first level, a second registry form for determining the target slave candidate layer of the first level from the storage space of the corresponding target master candidate layer.

In one embodiment, the second registry form for determining the target slave candidate layer of the first level may be preset in the storage space of the corresponding target master candidate layer, and in the case where the target candidate layer is the target slave candidate layer of the first level, the above described second registry form may be acquired from the storage space of the corresponding target master candidate layer.

Continue to take FIG. 2 as an example, when the target master candidate layer is the element layer, the second registry form for determining the target slave candidate layer of the first level may be acquired from the storage space of the element layer; or when the target master candidate layer is the smear layer, the second registry form for determining the target slave candidate layer of the first level may be acquired from the storage space of the smear layer.

Mode 3: acquiring, in the case where the target candidate layer is a target slave candidate layer whose level is lower than the first level, a third registry form for determining the target slave candidate layer whose level is lower than the first level from the storage space of the target slave candidate layer of the previous level corresponding to the target slave candidate layer whose level is lower than the first level;

In one embodiment, the third registry form for determining the target slave candidate layer whose level is lower than the first level may be preset in the storage space of the target slave candidate layer of the previous level corresponding to the target slave candidate layer whose level is lower than the first level, and in the case where the target candidate layer is the target slave candidate layer whose level is lower than the first level, the above described third registry form may be acquired from the storage space of the target slave candidate layer of the previous level corresponding to the target slave candidate layer whose level is lower than the first level.

Continue to take FIG. 2 as an example, when the target slave candidate layer of the previous level corresponding to the target slave candidate layer whose level is lower than the first level is the slave candidate layer of elements, the third registry form for determining the target slave candidate layer whose level is lower than the first level may be acquired from the storage space of the slave candidate layer of elements; when the target slave candidate layer of the previous level corresponding to the target slave candidate layer whose level is lower than the first level is the slave candidate layer of dot element, the third registry form for determining the target slave candidate layer whose level is lower than the first level may be acquired from the storage space of the slave candidate layer of dot element.

Thus in this method, according to the categories of the target candidate layer, the registry form may be acquired from the preset storage space, so that the flexibility is high.

S402 of recognizing that the annotation event corresponding to the candidate layer in the annotation tool is located in the registry form, and determining the candidate layer as the target candidate layer.

In an embodiment of the present disclosure, the browser recognizes that the annotation event corresponding to the candidate layer is located in the registry form, which indicates that the annotation event corresponding to the candidate layer has been pre-registered in the registry form, so that the candidate layer can be determined as the target candidate layer.

Continue to take FIG. 2 as an example, the candidate layers may include the picture layer, the element layer, the annotation layer, the smear layer, the text layer, the temporary layer and the event layer, and if the annotation event corresponding to the element layer is located in the first registry form, the element layer can be determined as the target master candidate layer;

the candidate layers may include the slave candidate layer of elements and the slave candidate layer of addition and deletion of elements, and if the annotation event corresponding to the slave candidate layer of elements and the slave candidate layer of addition and deletion of elements is located in the second registry form, the slave candidate layer of elements and the slave candidate layer of addition and deletion of elements can be determined as the target slave candidate layers of the first level;

the candidate layers may include a slave candidate layer of dot element, a slave candidate layer of line element, a slave candidate layer of rectangle element, a slave candidate layer of polygon element, a slave candidate layer of polyline element, and a slave candidate layer of circle element, and if the annotation event corresponding to the slave candidate layer of dot element is located in the third registry form, the slave candidate layer of dot element can be determined as the target slave candidate layers of the second level;

the candidate layers may include a slave candidate layer of shape and a slave candidate layer of prop and style, and if the annotation event corresponding to the slave candidate layer of shape and the slave candidate layer of prop and style is located in the third registry form, the slave candidate layer of shape and the slave candidate layer of prop and style can be determined as the target slave candidate layers of the third level.

To sum up, according to the picture annotation method of the embodiment of the present disclosure, the registry form for determining the target candidate layer may be acquired, and if it is recognized that the annotation event corresponding to the candidate layer is located in the registry form, so that automatic determination of the target candidate layers can be achieved based on the registry form.

Figure 5:
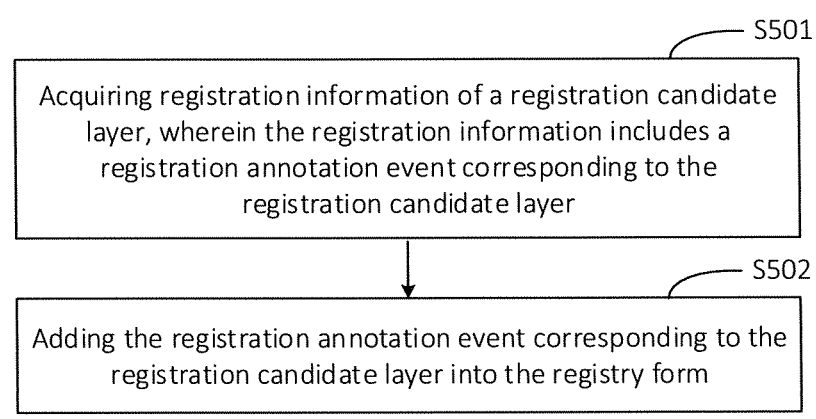
FIG. 5 is a schematic flowchart of a picture annotation method according to a fifth embodiment of the present disclosure.

FIG. 5 is a schematic flowchart of the picture annotation method according to a fifth embodiment of the present disclosure.

As shown in FIG. 5, the picture annotation method of the fifth embodiment of the present disclosure includes:

S501 of acquiring registration information of a registration candidate layer, wherein the registration information includes a registration annotation event corresponding to the registration candidate layer.

In an embodiment of the present disclosure, the browser may acquire registration information of the registration candidate layer, wherein the registration information includes a registration annotation event corresponding to the registration candidate layer, wherein the registration candidate layer may include at least one of a master candidate layer and a slave candidate layer.

In one embodiment, the browser can receive operation instruction from the user, wherein the operation instruction carries registration information.

In one embodiment, the browser can receive the registration information sent by the registration candidate layer.

S502 of adding the registration annotation event corresponding to the registration candidate layer into the registry form.

In one embodiment, the registration annotation event corresponding to the registration candidate layer may be added into the registry form in the storage space of the browser and/or the annotation tool.

In one embodiment, the adding the registration annotation event corresponding to the registration candidate layer into the registry form may include the following three possible implementation modes:

Mode 1: adding, in the case where the registration candidate layer is a master candidate layer, the registration annotation event corresponding to the master candidate layer into the first registry form.

Continuing to take FIG. 2 as an example, when the registration candidate layer is the element layer, it can be recognized that the registration candidate layer is the master candidate layer, and the registration annotation event corresponding to the element layer is added to the first registry form in the storage space of the annotation tool.

Mode 2: adding, in the case where the registration candidate layer is a slave candidate layer of a first level, the registration annotation event corresponding to the slave candidate layer of the first level into the second registry form.

Continuing to take FIG. 2 as an example, when the registration candidate layer is the slave candidate layer of elements, it can be recognized that the registration candidate layer is the slave candidate layers of the first level, and the registration annotation event corresponding to the slave candidate layer of elements is added to the second registry form in the storage space of the element layer.

Mode 3: adding, in the case where the registration candidate layer is a slave candidate layer whose level is lower than the first level, the registration annotation event corresponding to the slave candidate layer whose level is lower than the first level into the third registry form.

Continuing to take FIG. 2 as an example, when the registration candidate layer is the slave candidate layer of dot element, it can be recognized that the registration candidate layer is the slave candidate layers of the second level, and the registration annotation event corresponding to the slave candidate layer of dot element is added to the third registry form in the storage space of the slave candidate layer of elements.

Thus in this method, according to the categories of the registration candidate layer, the registration annotation event corresponding to the registration candidate layer can be added to the preset registry form, which has high flexibility.

To sum up, according to the picture annotation method of the embodiment of the present disclosure, the registration information of the registration candidate layer may be acquired, wherein the registration information includes a registration annotation event corresponding to the registration candidate layer, and the registration annotation event corresponding may be added into the registration candidate layer into the registry form, so that automatic registration of the registration annotation event corresponding to the registration candidate layer can be realized.

Figure 6:
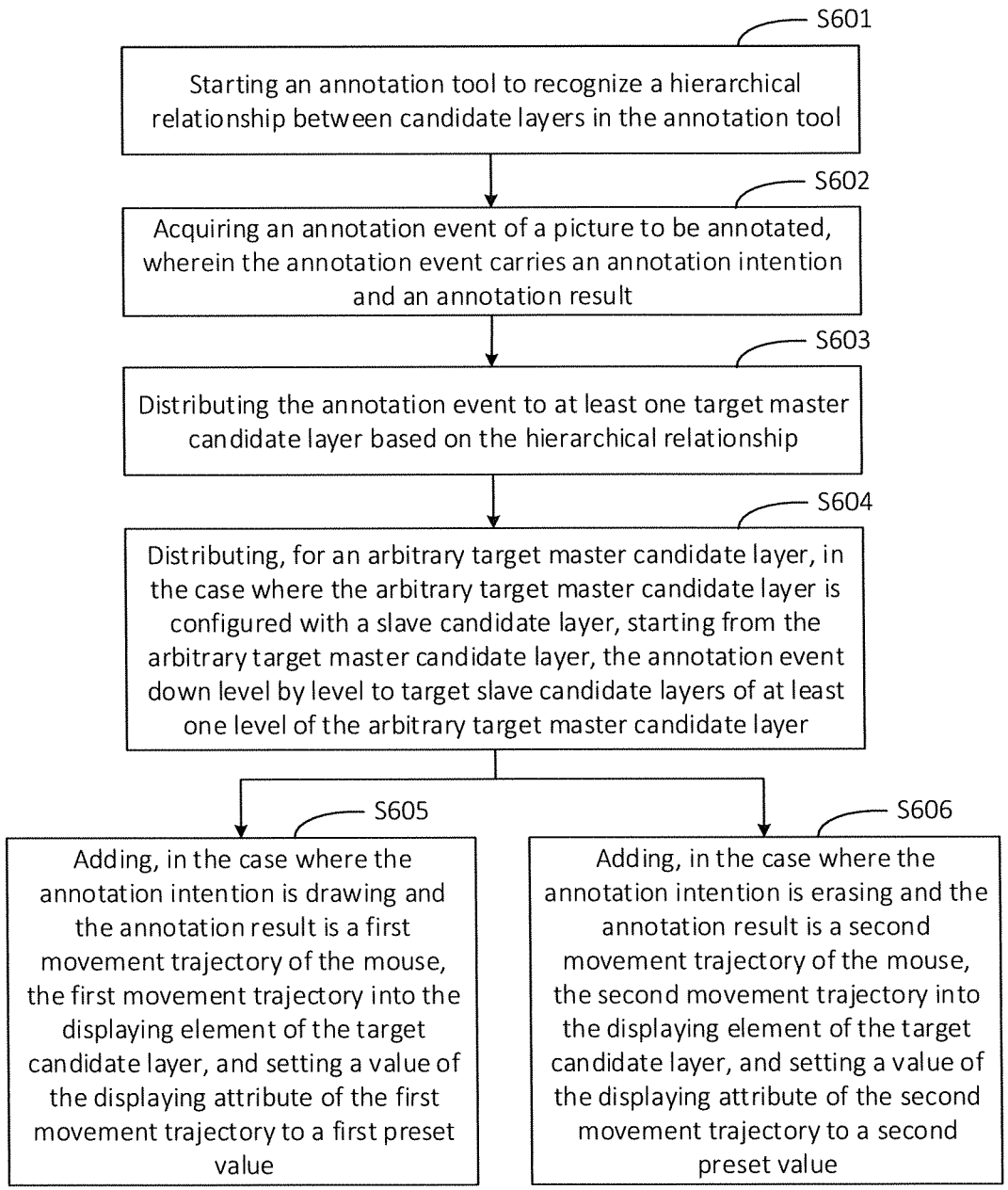
FIG. 6 is a schematic flowchart of a picture annotation method according to a sixth embodiment of the present disclosure.

FIG. 6 is a schematic flowchart of a picture annotation method according to a sixth embodiment of the present disclosure.

As shown in FIG. 6, the picture annotation method of the sixth embodiment of the present disclosure includes:

S601 of starting an annotation tool to recognize a hierarchical relationship between candidate layers in the annotation tool.

S602 of acquiring an annotation event of a picture to be annotated, wherein the annotation event carries an annotation intention and an annotation result.

In the embodiment of the present disclosure, the annotation event carries the annotation intention and the annotation result. It should be noted that the categories of the annotation intention and the annotation result will not be excessively limited. For example, the annotation intentions include, but are not limited to, drawing, erasing, addition, deletion and the like, and the annotation results include, but are not limited to, mouse movement trajectory, mouse single-click, mouse double-click, mouse click position, input text, and the like, which will not be excessively limited here.

S603 of distributing the annotation event to at least one target master candidate layer based on the hierarchical relationship.

S604 of distributing, for an arbitrary target master candidate layer, in the case where the arbitrary target master candidate layer is configured with a slave candidate layer, starting from the arbitrary target master candidate layer, the annotation event down level by level to target slave candidate layers of at least one level of the arbitrary target master candidate layer.

Relevant contents of the steps S601-S604 may be referred to the above described embodiment, and will not be repeated here.

S605 of adding, in the case where the annotation intention is drawing and the annotation result is a first movement trajectory of the mouse, the first movement trajectory into the displaying element of the target candidate layer, and setting a value of the displaying attribute of the first movement trajectory to a first preset value.

In an embodiment of the present disclosure, the target candidate layer may include a first target candidate layer and/or a second target candidate layer. Wherein the first target candidate layer includes a target master candidate layer and/or a target slave candidate layer, and the second target candidate layer includes a target master candidate layer.

In an embodiment of the present disclosure, in the case where the annotation intention is drawing and the annotation result is a first movement trajectory of the mouse, the browser may add the first movement trajectory into the displaying element of the target candidate layer, and set a value of the displaying attribute of the first movement trajectory to a first preset value.

It should be noted that the target candidate layer is used to present displaying elements, and the categories of the displaying elements will not be excessively limited. For example, the displaying elements include, but are not limited to, dot elements, line elements, box elements and the like. The displaying element has a displaying attribute, and the displaying attribute is used to characterize the displaying effect of the displaying element. The categories of the displaying attributes will not be excessively limited. For example, the displaying attributes may include the general operation attributes of the Global Composite Operation of the Canvas. The first preset value is used to draw the first movement trajectory on the target candidate layer, and the first preset value will not be excessively limited.

S606 of adding, in the case where the annotation intention is erasing and the annotation result is a second movement trajectory of the mouse, the second movement trajectory into the displaying element of the target candidate layer, and setting a value of the displaying attribute of the second movement trajectory to a second preset value.

In an embodiment of the present disclosure, the browser may add, in the case where the annotation intention is erasing and the annotation result is a second movement trajectory of the mouse, the second movement trajectory into the displaying element of the target candidate layer, and set a value of the displaying attribute of the second movement trajectory to a second preset value.

It should be noted that the second preset value is different from the first preset value, and the second preset value is configured to erase the second movement trajectory on the target candidate layer, and the second preset value will not be excessively limited.

It should be noted that the movement trajectory will not be excessively limited. For example, the movement trajectory may include a combination of line segments such as straight lines, curves and the like. Wherein the movement trajectory includes a first movement trajectory and a second movement trajectory.

To sum up, according to the picture annotation method of the embodiment of the present disclosure, when the annotation intention is drawing or erasing, the movement trajectory of the mouse may be added into the displaying element of the target candidate layer, and the value of the displaying attribute of the movement trajectory may be set to a preset value. Thus, drawing or erasing effect can be realized based on the movement trajectory of the mouse, which can avoid the browser from processing pixel-level data, greatly reduce the amount of data that the browser needs to process for smearing annotations, save the computational resources of the browser, and alleviate stuck problem of smearing annotations of the browser.

Figure 7:
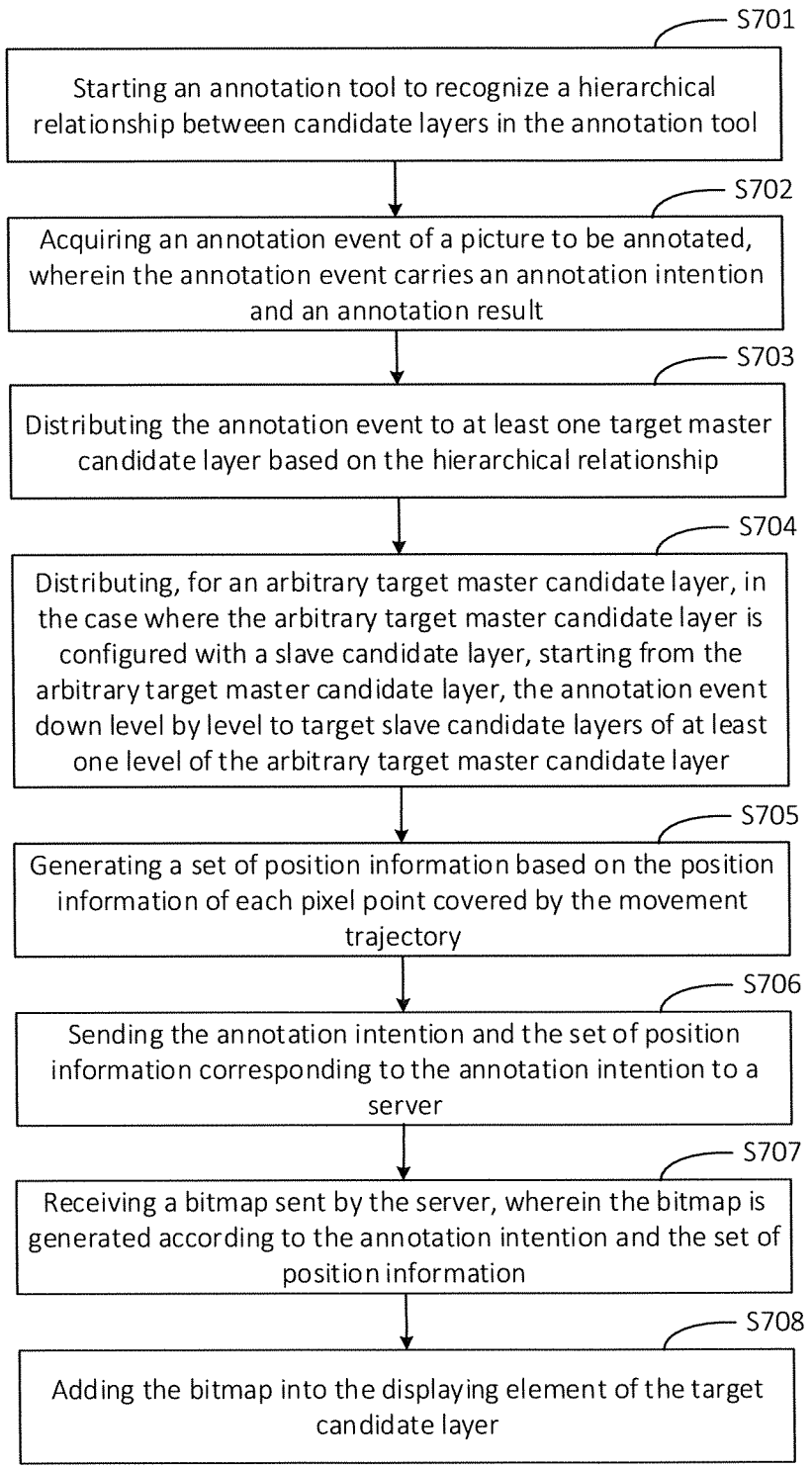
FIG. 7 is a schematic flowchart of a picture annotation method according to a seventh embodiment of the present disclosure.

FIG. 7 is a schematic flowchart of a picture annotation method according to a seventh embodiment of the present disclosure.

As shown in FIG. 7, the picture annotation method of the seventh embodiment of the present disclosure includes:

S701 of starting an annotation tool to recognize a hierarchical relationship between candidate layers in the annotation tool.

S702 of acquiring an annotation event of a picture to be annotated, wherein the annotation event carries an annotation intention and an annotation result.

S703 of distributing the annotation event to at least one target master candidate layer based on the hierarchical relationship.

S704 of distributing, for an arbitrary target master candidate layer, in the case where the arbitrary target master candidate layer is configured with a slave candidate layer, starting from the arbitrary target master candidate layer, the annotation event down level by level to target slave candidate layers of at least one level of the arbitrary target master candidate layer.

Relevant contents of the steps S701-S704 may be referred to the above described embodiment, and will not be repeated here.

S705 of generating a set of position information based on the position information of each pixel point covered by the movement trajectory.

In an embodiment of the present disclosure, the browser may generate a set of position information based on the position information of each pixel point covered by the movement trajectory, that is, the set of position information includes the position information of each pixel point covered by the movement trajectory. It should be noted that the categories of the movement trajectory will not be excessively limited. For example, when the annotation intention is drawing, the movement trajectory is the first movement trajectory; when the annotation intention is erasing, the movement trajectory is the second movement trajectory. The categories of the position information will not be excessively limited. For example, the position information may be coordinate information of the pixel point on the picture to be annotated.

It can be understood that there is a corresponding relationship between the movement trajectory and the set of position information, and one movement trajectory corresponds to one set of position information.

In one embodiment, the annotation intention is drawing, and the movement trajectory is the first movement trajectory, and the first set of position information can be generated based on the position information of each pixel point covered by the first movement trajectory.

In one embodiment, the annotation intention is erasing, and the movement trajectory is the second movement trajectory, and the second set of position information can be generated based on the position information of each pixel point covered by the second movement trajectory.

In one embodiment, after generating the set of position information, the method may include compressing the set of position information, and updating the set of position information according to the compressed set of position information. Thus in this method, the set of position information can be compressed, which can greatly reduce the data volume of the set of position information, and help to save computing resources of the browser.

S706 of sending the annotation intention and the set of position information corresponding to the annotation intention to a server.

It should be noted that the server refers to the server that provides services for the browser and/or the annotation tool.

In one embodiment, the annotation intention is drawing, and the set of position information corresponding to the drawing is the first set of position information, then the drawing and the first set of position information can be sent to the server.

In one embodiment, the annotation intention is erasing, and the set of position information corresponding to the erasing is the second set of position information, then the erasing and the second set of position information can be sent to the server.

S707 of receiving a bitmap sent by the server, wherein the bitmap is generated according to the annotation intention and the set of position information.

S708 of adding the bitmap into the displaying element of the target candidate layer.

In an embodiment of the present disclosure, the browser can receive the bitmap sent by the server, wherein the bitmap is generated according to the annotation intention and the set of position information, and the bitmap may be added into the displaying element of the target candidate layer.

In one embodiment, the size of the bitmap is consistent with the size of the picture to be annotated.

To sum up, according to the picture annotation method of the embodiment of the present disclosure, the annotation intention and the set of position information corresponding to the annotation intention may be sent to a server, a bitmap sent by the server may be received, the bitmap being generated according to the annotation intention and the set of position information, and the bitmap may be added into the displaying element of the target candidate layer. Thus the echoing effect can be realized based on the bitmap sent by the server, which can avoid the browser from processing pixel-level data, greatly reduce the amount of data that the browser needs to process for smearing annotations, save the computational resources of the browser, and alleviate stuck problem of smearing annotations of the browser.

Figure 8:
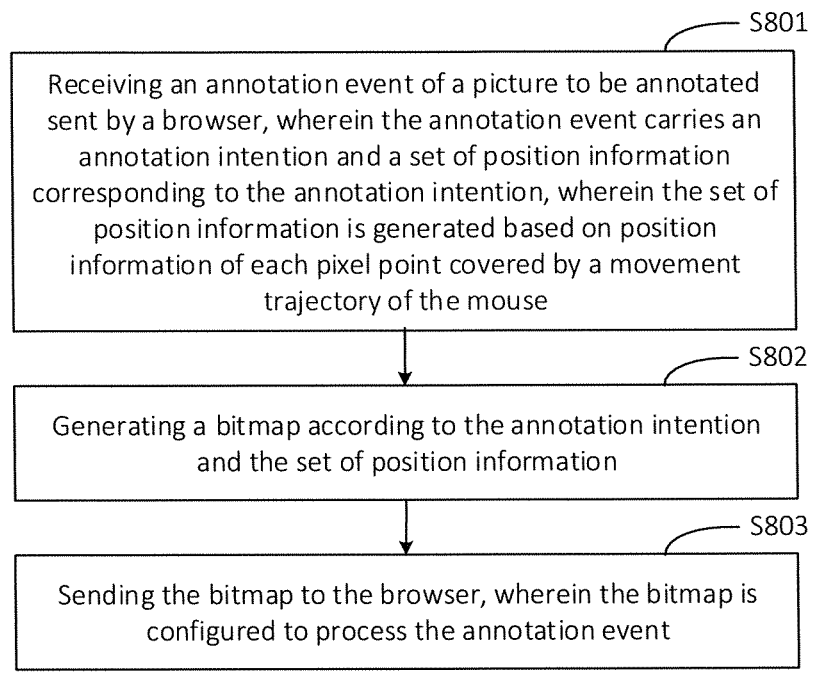
FIG. 8 is a schematic flowchart of a picture annotation method according to an eighth embodiment of the present disclosure.

FIG. 8 is a schematic flowchart of a picture annotation method according to an eighth embodiment of the present disclosure.

As shown in FIG. 8, the picture annotation method of the eighth embodiment of the present disclosure includes:

S801 of receiving an annotation event of a picture to be annotated sent by a browser, wherein the annotation event carries an annotation intention and a set of position information corresponding to the annotation intention, wherein the set of position information is generated based on position information of each pixel point covered by a movement trajectory of the mouse.

It should be noted that the execution subject of the picture annotation method of the embodiment of the present disclosure may be a hardware device having data information processing capability and/or necessary software required to drive the hardware device to operate. Optionally, the execution subject may include workstations, servers, computers, user terminals and other intelligent devices. Wherein the user terminal includes, but is not limited to, a mobile phone, a computer, an intelligent voice interaction device, a smart home appliance, a vehicle terminal, and the like. In one embodiment, the execution subject may be a server, and the picture annotation method of the embodiment of the present disclosure will be described below by taking the execution subject as a server as an example.

In an embodiment of the present disclosure, the server may receive an annotation event of a picture to be annotated sent by a browser, wherein the annotation event carries an annotation intention and a set of position information corresponding to the annotation intention, and the set of position information is generated based on position information of each pixel point covered by a movement trajectory of the mouse.

It should be noted that, for the relevant contents of the picture to be annotated, the annotation event, the annotation intention, the set of position information, the movement trajectory, and the position information, please refer to the above described embodiments, which will not be repeated here.

S802 of generating a bitmap according to the annotation intention and the set of position information.

S803 of sending the bitmap to the browser, wherein the bitmap is configured to process the annotation event.

In an embodiment of the present disclosure, the server may generate a bitmap according to the annotation intention and the set of position information and send the bitmap to the browser. It should be noted that the relevant contents of the bitmap used to process the annotation event can refer to the above described embodiments, which will not be repeated here.

In one embodiment, the generating a bitmap according to the annotation intention and the set of position information may include acquiring a transparent bitmap whose size is the size of the picture to be annotated, acquiring a target region of the set of position information on the transparent bitmap, and setting the value of each position in the target region according to the annotation intention. It should be noted that the value of each position in the target region will not be excessively limited, for example, may be 0 or 1.

In one embodiment, the acquiring the target region of the set of position information on the transparent bitmap may include generating a target region on the transparent bitmap based on each position information in the set of position information.

In one embodiment, the setting the value of each position in the target region according to the annotation intention may include: recognizing that the annotation intention is drawing, and setting the value of each position in the target region to 1; recognizing that the annotation intention is erasing, and setting the value of each position in the target region to 0.

To sum up, according to the picture annotation method of the embodiment of the present disclosure, the server may receive the annotation intention and the set of position information corresponding to the annotation intention sent by a browser, generate a bitmap according to the annotation intention and the set of position information, and send the bitmap to the browser. Thus the server can send the bitmap to the browser to realize the echoing effect, which can avoid the browser from processing pixel-level data, greatly reduce the amount of data that the browser needs to process for smearing annotations, save the computational resources of the browser, and alleviate stuck problem of smearing annotations of the browser.

In the technical solution of the present disclosure, process, such as collection, storage, use, processing, transmission, provision, disclosure and the like, of user personal information involved are all in compliance with relevant laws and regulations, and do not violate public order and good customs.

According to embodiments of the present disclosure, the present disclosure further provides a picture annotation apparatus, which is used to implement the above described picture annotation method.

Figure 9:
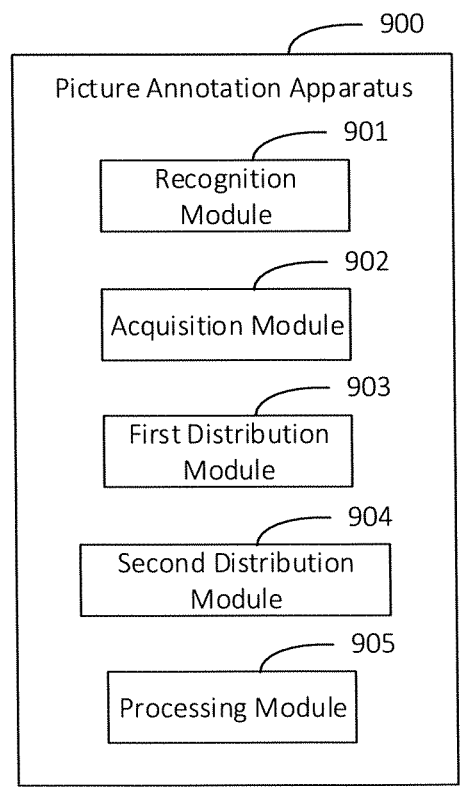
FIG. 9 is a block diagram of a picture annotation apparatus according to a first embodiment of the present disclosure.

FIG. 9 is a block diagram of a picture annotation apparatus according to a first embodiment of the present disclosure.

As shown in FIG. 9, the picture annotation apparatus 900 of the embodiment of the present disclosure includes: a recognition module 901, an acquisition module 902, a first distribution module 903, a second distribution module 904 and a processing module 905.

the recognition module 901 is configured to start an annotation tool to recognize a hierarchical relationship between candidate layers in the annotation tool;

the acquisition module 902 is configured to acquire an annotation event of a picture to be annotated;

the first distribution module 903 is configured to distribute the annotation event to at least one target master candidate layer based on the hierarchical relationship;

the second distribution module 904 is configured to distribute, for an arbitrary target master candidate layer, in the case where the arbitrary target master candidate layer is configured with a slave candidate layer, starting from the arbitrary target master candidate layer, the annotation event down level by level to target slave candidate layers of at least one level of the arbitrary target master candidate layer;

the processing module 905 is configured to process the annotation event through a first target candidate layer, to which it is distributed, wherein the first target candidate layer includes the target master candidate layer and/or the target slave candidate layer;

the processing module 905 is further configured to process, for an arbitrary target master candidate layer, in the case where the arbitrary target master candidate layer is configured with no slave candidate layer, the annotation event through a second target candidate layer, to which it is distributed, wherein the second target candidate layer includes the target master candidate layer.

In an embodiment of the present disclosure, the second distribution module 904 is further configured to: determine target slave candidate layers of a first level from slave candidate layers of a first level of the arbitrary target master candidate layer, and distribute the annotation event to the target slave candidate layers of the first level; determine, starting from the target slave candidate layers of the first level, target slave candidate layers of a next level from slave candidate layers of a next level of target slave candidate layers of a current level, to which it is distributed, and distribute the annotation event to the target slave candidate layers of the next level, until traversing to the slave candidate layers of the last level.

In an embodiment of the present disclosure, the picture annotation apparatus 900 includes a determination module, which includes: a first acquisition unit configured to acquire a registry form for determining the target candidate layer, wherein the target candidate layer includes the first target candidate layer and/or the second target candidate layer; a determination unit configured to recognize that the annotation event corresponding to the candidate layer in the annotation tool is located in the registry form, and determining the candidate layer as the target candidate layer.

In an embodiment of the present disclosure, the first acquisition unit is further configured to: acquire, in the case where the target candidate layer is the target master candidate layer, a first registry form for determining the target master candidate layer from a local storage of the annotation tool; or acquire, in the case where the target candidate layer is a target slave candidate layer of a first level, a second registry form for determining the target slave candidate layer of the first level from the storage space of the corresponding target master candidate layer; or acquire, in the case where the target candidate layer is a target slave candidate layer whose level is lower than the first level, a third registry form for determining the target slave candidate layer whose level is lower than the first level from the storage space of the target slave candidate layer of the upper level corresponding to the target slave candidate layer whose level is lower than the first level;

In an embodiment of the present disclosure, the picture annotation apparatus 900 further includes a registration module, which includes: a second acquisition unit configured to acquire registration information of a registration candidate layer, wherein the registration information includes a registration annotation event corresponding to the registration candidate layer; an addition unit configured to add, in the case where the registration candidate layer is a master candidate layer, the registration annotation event corresponding to the master candidate layer into the first registry form; or add, in the case where the registration candidate layer is a slave candidate layer of a first level, the registration annotation event corresponding to the slave candidate layer of the first level into the second registry form; or add, in the case where the registration candidate layer is a slave candidate layer whose level is lower than the first level, the registration annotation event corresponding to the slave candidate layer whose level is lower than the first level into the third registry form.

In an embodiment of the present disclosure, the picture annotation apparatus 900 further includes: a configuration module, which is configured to: acquire, for an arbitrary master candidate layer, in the case where the arbitrary master candidate layer is configured with a slave candidate layer, attribute configuration information of the arbitrary master candidate layer; distribute, starting from the arbitrary master candidate layer, the attribute configuration information down level by level to each slave candidate layer of each level of the arbitrary master candidate layer, wherein the attribute configuration information is configured to configure attributes of the candidate layers, the candidate layers including the master candidate layer and the slave candidate layer.

In an embodiment of the present disclosure, the annotation event carries an annotation intention and an annotation result; the processing module 905 is further configured to: add, in the case where the annotation intention is drawing and the annotation result is a first movement trajectory of the mouse, the first movement trajectory into the display element of the target candidate layer, and set a value of the display attribute of the first movement trajectory to a first preset value, wherein the first preset value is configured to draw the first movement trajectory on the target candidate layer;

or add, in the case where the annotation intention is erasing and the annotation result is a second movement trajectory of the mouse, the second movement trajectory into the display element of the target candidate layer, and set a value of the display attribute of the second movement trajectory to a second preset value, wherein the second preset value is different from the first preset value, and the second preset value is configured to erase the second movement trajectory on the target candidate layer; wherein the target candidate layer includes the first target candidate layer and/or the second target candidate layer.

In an embodiment of the present disclosure, the processing module 905 is further configured to: generate a set of position information based on the position information of each pixel point covered by the movement trajectory, wherein the movement trajectory includes the first movement trajectory and/or the second movement trajectory; send the annotation intention and the set of position information corresponding to the annotation intention to a server; receive a bitmap sent by the server, wherein the bitmap is generated according to the annotation intention and the set of position information; add the bitmap into the display element of the target candidate layer.

To sum up, in the picture annotation apparatus of the embodiment of the present disclosure, the hierarchical relationship between the candidate layers in the annotation tool may be recognized, and the annotation event may be distributed to the target master candidate layer based on the hierarchical relationship, and in the case where the target master candidate layer is configured with a slave candidate layer, continue to be distributed down level by level to the target slave candidate layers of at least one level of the target master candidate layer, and the annotation event may be processed through the target candidate layers, to which it is distributed. Thus the level-by-level distribution of the annotation event can be realized based on the hierarchical relationship of the annotation tool, so that the coupling degree of the annotation event between the candidate layers is small, especially for online annotation scenarios on the browser side, the scalability is better, and development difficulty and cost of image annotation is greatly reduced.

According to an embodiment of the present disclosure, the present disclosure also provides another picture annotation apparatus, which is used to implement the above described picture annotation method.

Figure 10:
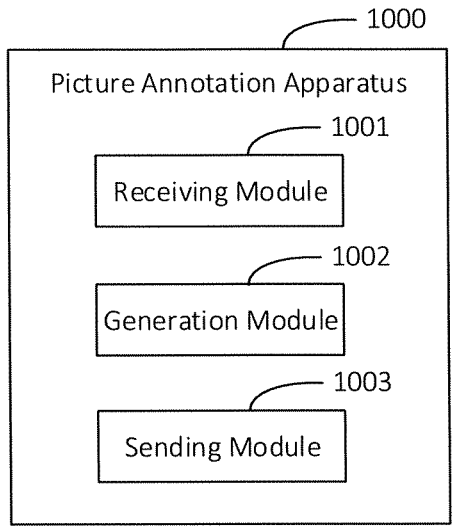
FIG. 10 is a block diagram of a picture annotation apparatus according to a second embodiment of the present disclosure.

FIG. 10 is a block diagram of a picture annotation apparatus according to a second embodiment of the present disclosure.

As shown in FIG. 10, the picture annotation apparatus 1000 of the embodiment of the present disclosure includes: a receiving module 1001, a generation module 1002 and a sending module 1003.

the receiving module 1001 is configured to receive an annotation event of a picture to be annotated sent by a browser, wherein the annotation event carries an annotation intention and a set of position information corresponding to the annotation intention, the set of position information being generated based on position information of each pixel point covered by a movement trajectory of the mouse;

the generation module 1002 is configured to generate a bitmap according to the annotation intention and the set of position information;

the sending module 1003 is configured to send the bitmap to the browser, wherein the bitmap is configured to process the annotation event.

To sum up, the picture annotation apparatus of the embodiment of the present disclosure may receive the annotation intention and the set of position information corresponding to the annotation intention sent by a browser, generate a bitmap according to the annotation intention and the set of position information, and send the bitmap to the browser. Thus the bitmap can be sent to the browser to realize the echoing effect, which can avoid the browser from processing pixel-level data, greatly reduce the amount of data that the browser needs to process for smearing annotations, save the computational resources of the browser, and alleviate stuck problem of smearing annotations of the browser.

According to the embodiments of the present disclosure, the present disclosure also provides an electronic device, a readable storage medium, and a computer program product.

Figure 11:
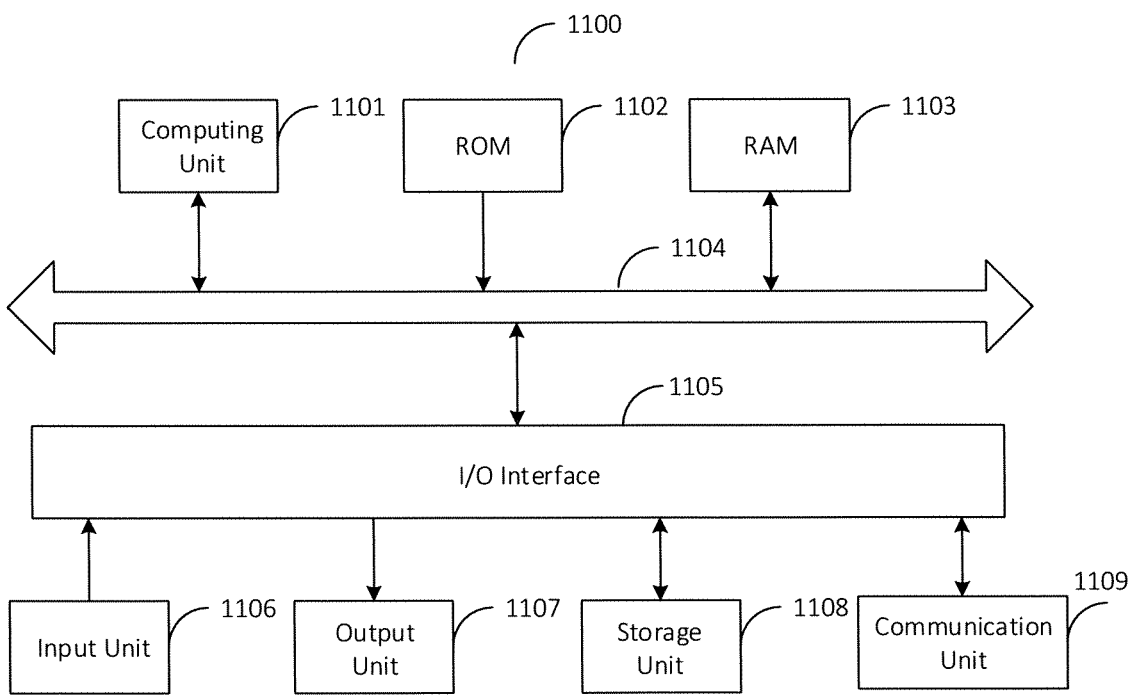
FIG. 11 is a block diagram of an electronic device used to implement the picture annotation method according to an embodiment of the present disclosure.

FIG. 11 shows a schematic block diagram of an example electronic device 1100 that may be used to implement embodiments of the present disclosure. An electronic device is intended to represent various forms of digital computers, such as laptops, desktops, workstations, personal digital assistants, servers, blade servers, masterframes, and other suitable computers. An electronic device may also represent various forms of mobile apparatuses, such as personal digital processing, cellular telephones, smart phones, wearable devices, and other similar computing apparatuses. The components shown herein, their connections and relationships, and their functions, are by way of example only, and are not intended to limit implementations of the present disclosure described and/or claimed herein.

As shown in FIG. 11, an electronic device 1100 includes a computing unit 1101 that can perform various appropriate actions and processes according to a computer program stored in a read-only memory (ROM) 1102 or a computer program loaded from a storage unit 1108 into a random access memory (RAM) 1103. Various appropriate actions and processes are performed. In the RAM 1103, various programs and data necessary for the operation of the electronic device 1100 can also be stored. The computing unit 1101, the ROM 1102, and the RAM 1103 are connected to each other through a bus 1104. An input/output (I/O) interface 1105 is also connected to the bus 1104.

Multiple components in the electronic device 1100 are connected to the I/O interface 1105, including: an input unit 1106, such as a keyboard, a mouse, etc.; an output unit 1107, such as various types of displays, speakers, etc.; a storage unit 1108, such as a magnetic disk, an optical disk, and the like; and a communication unit 1109, such as a network card, a modem, a wireless communication transceiver, and the like. The communication unit 1109 allows the electronic device 1100 to exchange information/data with other devices through a computer network such as the Internet and/or various telecommunication networks.

The computing unit 1101 may be various general-purpose and/or special-purpose processing components having processing and computing capabilities. Some examples of the computing unit 1101 include, but are not limited to, central processing units (CPUs), graphics processing units (GPUs), various dedicated artificial intelligence (AI) computing chips, various computing units that run machine learning model algorithms, digital signal processing processor (DSP), and any suitable processors, controllers, microcontrollers, and the like. The computing unit 1101 executes various methods and processes described above, such as the picture annotation methods shown in FIG. 1 to FIG. 4. For example, in some embodiments, the picture annotation methods may be implemented as computer software programs, which are tangibly included in a machine-readable medium, such as the storage unit 1108. In some embodiments, part or all of the computer programs can be loaded and/or installed on the electronic device 1100 via the ROM 1102 and/or the communication unit 1109. When the computer program is loaded into the RAM 1103 and executed by the computing unit 1101, one or more steps of the picture annotation methods described above may be executed. Alternatively, in other embodiments, the computing unit 1101 may be configured to execute the picture annotation methods in any other appropriate manner (for example, by means of firmware).

Various embodiments of the systems and techniques described above herein can be implemented in digital electronic circuit systems, integrated circuit systems, field programmable gate arrays (FPGAs), application specific integrated circuits (ASICs), application specific standard products (ASSPs), system of System-On-Chip (SOC), Load Programmable Logic Device (CPLD), computer hardware, firmware, software, and/or combinations thereof. These various embodiments may include: being implemented in one or more computer programs, which can be executed and/or interpreted on a programmable system including at least one programmable processor, and the programmable processor may be a special-purpose or a general-purpose programmable processor, can receive data and instructions from a storage system, at least one input device, and at least one output device, and transmit data and instructions to this storage system, this at least one input device, and this at least one output device.

Program codes for implementing the methods of the present disclosure may be written in any combination of one or more programming languages. These program codes may be provided to a processor or a controller of a general-purpose computer, a special purpose computer, or other programmable data processing devices, so that the program codes, when executed by the processor or the controller, cause functions/operations specified in the flow diagrams and/or the block diagrams to be implemented. The program codes may be executed entirely on a machine, partly on a machine, as a stand-alone software package partly on a machine and partly on a remote machine or entirely on the remote machine or a server.

In the context of the present disclosure, the machine-readable medium may be a tangible medium that may contain or store a program for use by or in conjunction with an instruction execution system, an apparatus, or a device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of machine-readable storage media would include electrical connections based on one or more wires, portable computer disks, hard disks, Random Access Memories (RAMs), Read Only Memories (ROMs), Erasable Programmable Read Only Memories (EPROMs or flash memories), fiber optics, portable compact disk read-only memories (CD-ROMs), optical storage devices, magnetic storage devices, or any suitable combination of the foregoing.

To provide for interaction with a user, the systems and techniques described here can be implemented on a computer, which has: a display device (for example, a CRT (cathode ray tube) or LCD (liquid crystal display) monitor) for displaying information to the user; and a keyboard and pointing device (for example, a mouse or a trackball), through which the user can provide input to the computer. Other kinds of devices may also be used to provide interaction with the user; for example, feedback provided to the user may be any form of sensory feedback (for example, visual feedback, auditory feedback, or tactile feedback); and input from the user may be received in any form (including acoustic input, voice input, or tactile input).

The systems and techniques described here may be implemented in a computing system (for example, as a data server) that includes back-end components, or a computing system (for example, an application server) that includes middleware components, or a computing system (for example, a user computer having a graphical user interface or a web browser, through which a user can interact with embodiments of the systems and techniques described here) that includes front-end components, or a computing system that includes any combination of such back-end components, middleware components, or front-end components. The components of the system can be interconnected by any form or medium of digital data communication (for example, a communication network). Examples of the communication network include: local area networks (LANs), wide area networks (WANs), and the Internet.

The computer system may include clients and servers. Clients and servers are generally remote from each other and typically interact through a communication network. The relationship of client and server will be generated by computer programs running on the respective computers and having a client-server relationship to each other. The server may be a cloud server, also known as cloud computing server or cloud host, which is a host product in the cloud computing service system to solve defects such as difficult management and weak business scalability existing in the traditional physical host and the VPS service ("Virtual Private Server", or "VPS" for short). The server may also be a server of a distributed system, or a server combined with a blockchain.

According to an embodiment of the present disclosure, the present disclosure further provides a computer program product, including a computer program, wherein when the computer program is executed by a processor, the steps of the picture annotation methods according to the above-described embodiments of the present disclosure are implemented.

It should be understood that steps may be reordered, added or deleted using the various forms of flow shown above. For example, the respective steps disclosed in the present disclosure may be executed in parallel, may also be executed sequentially, or may also be executed in a different order, as long as the desired result of the technical solutions disclosed in the present disclosure can be achieved, and no limitation is imposed thereto herein.

The specific embodiments described above do not constitute a limitation on the protection scope of the present disclosure. It should be apparent to those skilled in the art that various modifications, combinations, sub-combinations and substitutions may be made depending on design requirements and other factors. Any modifications, equivalent replacements and improvements made within the spirit and the principle of the present disclosure shall be included within the protection scope of the present disclosure.

What is claimed is:

1. A picture annotation method, comprising:
   starting an annotation tool to recognize a hierarchical relationship between candidate layers in the annotation tool;
   acquiring an annotation event of a picture to be annotated;
   distributing the annotation event to at least one target master candidate layer based on the hierarchical relationship;
   distributing, for an arbitrary target master candidate layer, in the case where the arbitrary target master candidate layer is configured with a slave candidate layer, starting from the arbitrary target master candidate layer, the annotation event level by level to target slave candidate layers of at least one level of the arbitrary target master candidate layer;
   processing the annotation event through a first target candidate layer, to which the annotation event is distributed, wherein the first target candidate layer includes the target master candidate layer and/or the target slave candidate layer; or
   processing, for an arbitrary target master candidate layer, in the case where the arbitrary target master candidate layer is configured with no slave candidate layer, the annotation event through a second target candidate layer, to which the annotation event is distributed, wherein the second target candidate layer includes the target master candidate layer.

2. The method according to claim 1, wherein the distributing, starting from the arbitrary target master candidate layer, the annotation event down level by level to target slave candidate layers of at least one level of the arbitrary target master candidate layer comprises:
   determining target slave candidate layers of a first level from slave candidate layers of a first level of the arbitrary target master candidate layer, and distributing the annotation event to the target slave candidate layers of the first level;
   determining, starting from the target slave candidate layers of the first level, target slave candidate layers of a next level from slave candidate layers of a next level of target slave candidate layers of a current level, to which the annotation event is distributed, and distributing the annotation event to the target slave candidate layers of the next level, until traversing to the slave candidate layers of the last level.

3. The method according to claim 1, wherein the method further comprises:
   acquiring a registry form for determining the target candidate layer, wherein the target candidate layer at least includes the first target candidate layer, the second target candidate layer, or both the first target candidate layer and the second target candidate layer;
   recognizing that the annotation event corresponding to the candidate layer in the annotation tool is located in the registry form, and determining the candidate layer as the target candidate layer.

4. The method according to claim 3, wherein the acquiring the registry form for determining the target candidate layer comprises:
   acquiring, in the case where the target candidate layer is the target master candidate layer, a first registry form for determining the target master candidate layer from a local storage of the annotation tool; or
   acquiring, in the case where the target candidate layer is a target slave candidate layer of a first level, a second registry form for determining the target slave candidate layer of the first level from the storage space of the corresponding target master candidate layer; or
   acquiring, in the case where the target candidate layer is a target slave candidate layer whose level is lower than the first level, a third registry form for determining the target slave candidate layer whose level is lower than the first level from the storage space of the target slave candidate layer of the previous level corresponding to the target slave candidate layer whose level is lower than the first level;
   the method further comprises:
   acquiring registration information of a registration candidate layer, wherein the registration information includes a registration annotation event corresponding to the registration candidate layer;
   adding, in the case where the registration candidate layer is a master candidate layer, the registration annotation event corresponding to the master candidate layer into the first registry form; or
   adding, in the case where the registration candidate layer is a slave candidate layer of a first level, the registration annotation event corresponding to the slave candidate layer of the first level into the second registry form; or
   adding, in the case where the registration candidate layer is a slave candidate layer whose level is lower than the first level, the registration annotation event corresponding to the slave candidate layer whose level is lower than the first level into the third registry form.

5. The method according to claim 1, wherein the method further comprises:
   acquiring, for an arbitrary master candidate layer, in the case where the arbitrary master candidate layer is configured with a slave candidate layer, attribute configuration information of the arbitrary master candidate layer;
   distributing, starting from the arbitrary master candidate layer, the attribute configuration information down level by level to each slave candidate layer of each level of the arbitrary master candidate layer, wherein the attribute configuration information is configured to configure attributes of the candidate layers, the candidate layers including the master candidate layer and the slave candidate layer.

6. The method according to claim 1, wherein the annotation event carries an annotation intention and an annotation result; the processing the annotation event through the target candidate layer, to which the annotation event is distributed, comprises:
   adding, in the case where the annotation intention is drawing and the annotation result is a first movement trajectory of the mouse, the first movement trajectory into the displaying element of the target candidate layer, and setting a value of the displaying attribute of the first movement trajectory to a first preset value, wherein the first preset value is configured to draw the first movement trajectory on the target candidate layer; or
   adding, in the case where the annotation intention is erasing and the annotation result is a second movement trajectory of the mouse, the second movement trajectory into the displaying element of the target candidate layer, and setting a value of the displaying attribute of the second movement trajectory to a second preset value, wherein the second preset value is different from the first preset value, and the second preset value is configured to erase the second movement trajectory on the target candidate layer;

wherein the target candidate layer includes the first target candidate layer and/or the second target candidate layer.

7. The method according to claim 6, wherein the method further comprises:

generating a set of position information based on the position information of each pixel point covered by the movement trajectory, wherein the movement trajectory includes the first movement trajectory and/or the second movement trajectory;

sending the annotation intention and the set of position information corresponding to the annotation intention to a server;

receiving a bitmap sent by the server, wherein the bitmap is generated according to the annotation intention and the set of position information;

adding the bitmap into the displaying element of the target candidate layer.

8. A non-transitory computer-readable storage medium storing computer instructions, wherein the computer instructions are configured to cause a computer to execute a picture annotation method according to claim 1.

9. An electronic device, comprising:

at least one processor; and a memory communicatively connected to the at least one processor; wherein instructions executable by the at least one processor are stored in the memory, and when the instructions are executed by the at least one processor, the at least one processor is configured to:

start an annotation tool to recognize a hierarchical relationship between candidate layers in the annotation tool;

acquire an annotation event of a picture to be annotated;

distribute the annotation event to at least one target master candidate layer based on the hierarchical relationship;

distribute, for an arbitrary target master candidate layer, in the case where the arbitrary target master candidate layer is configured with a slave candidate layer, starting from the arbitrary target master candidate layer, the annotation event level by level to target slave candidate layers of at least one level of the arbitrary target master candidate layer;

process the annotation event through a first target candidate layer, to which the annotation event is distributed, wherein the first target candidate layer includes the target master candidate layer and/or the target slave candidate layer; or process, for an arbitrary target master candidate layer, in the case where the arbitrary target master candidate layer is configured with no slave candidate layer, the annotation event through a second target candidate layer, to which the annotation event is distributed, wherein the second target candidate layer includes the target master candidate layer.

10. The electronic device according to claim 9, wherein the at least one processor is configured to:

determine target slave candidate layers of a first level from slave candidate layers of a first level of the arbitrary target master candidate layer, and distribute the annotation event to the target slave candidate layers of the first level;

determine, starting from the target slave candidate layers of the first level, target slave candidate layers of a next level from slave candidate layers of a next level of target slave candidate layers of a current level, to which the annotation event is distributed, and distribute the annotation event to the target slave candidate layers of the next level, until traversing to the slave candidate layers of the last level.

11. The electronic device according to claim 9, wherein the at least one processor is further configured to:

acquire a registry form for determining the target candidate layer, wherein the target candidate layer at least includes the first target candidate layer, the second target candidate layer, or both the first target candidate layer and the second target candidate layer;

recognize that the annotation event corresponding to the candidate layer in the annotation tool is located in the registry form, and determine the candidate layer as the target candidate layer.

12. The electronic device according to claim 11, wherein the at least one processor is configured to:

acquire, in the case where the target candidate layer is the target master candidate layer, a first registry form for determining the target master candidate layer from a local storage of the annotation tool; or acquire, in the case where the target candidate layer is a target slave candidate layer of a first level, a second registry form for determining the target slave candidate layer of the first level from the storage space of the corresponding target master candidate layer; or acquire, in the case where the target candidate layer is a target slave candidate layer whose level is lower than the first level, a third registry form for determining the target slave candidate layer whose level is lower than the first level from the storage space of the target slave candidate layer of the previous level corresponding to the target slave candidate layer whose level is lower than the first level;

wherein the at least one processor is further configured to:

acquire registration information of a registration candidate layer, wherein the registration information includes a registration annotation event corresponding to the registration candidate layer;

add, in the case where the registration candidate layer is a master candidate layer, the registration annotation event corresponding to the master candidate layer into the first registry form; or add, in the case where the registration candidate layer is a slave candidate layer of a first level, the registration annotation event corresponding to the slave candidate layer of the first level into the second registry form; or add, in the case where the registration candidate layer is a slave candidate layer whose level is lower than the first level, the registration annotation event corresponding to the slave candidate layer whose level is lower than the first level into the third registry form.

13. The electronic device according to claim 9, wherein the at least one processor is further configured to:

acquire, for an arbitrary master candidate layer, in the case where the arbitrary master candidate layer is configured with a slave candidate layer, attribute configuration information of the arbitrary master candidate layer;

distribute, starting from the arbitrary master candidate layer, the attribute configuration information down level by level to each slave candidate layer of each level of the arbitrary master candidate layer, wherein the attribute configuration information is configured to configure attributes of the candidate layers, the candidate layers including the master candidate layer and the slave candidate layer.

14. The electronic device according to claim 9, wherein the annotation event carries an annotation intention and an annotation result; the processor is configured to:

add, in the case where the annotation intention is drawing and the annotation result is a first movement trajectory of the mouse, the first movement trajectory into the displaying element of the target candidate layer, and set a value of the displaying attribute of the first movement trajectory to a first preset value, wherein the first preset value is configured to draw the first movement trajectory on the target candidate layer; or add, in the case where the annotation intention is erasing and the annotation result is a second movement trajectory of the mouse, the second movement trajectory into the displaying element of the target candidate layer, and set a value of the displaying attribute of the second movement trajectory to a second preset value, wherein the second preset value is different from the first preset value, and the second preset value is configured to erase the second movement trajectory on the target candidate layer;

wherein the target candidate layer at least includes the first target candidate layer, or the second target candidate layer, or both the first target candidate layer and the second target candidate layer.

15. The electronic device according to claim 14, wherein the at least one processor is configured to:

generate a set of position information based on the position information of each pixel point covered by the movement trajectory, wherein the movement trajectory includes the first movement trajectory and/or the second movement trajectory;

send the annotation intention and the set of position information corresponding to the annotation intention to a server;

receive a bitmap sent by the server, wherein the bitmap is generated according to the annotation intention and the set of position information;

add the bitmap into the displaying element of the target candidate layer.

* * * * *